United States Patent [19]

Masuda

[11] Patent Number: 4,956,213

[45] Date of Patent: Sep. 11, 1990

[54] INFORMATION RECORDING MEDIUM

[75] Inventor: Toshiyuki Masuda, Shizuoka, Japan

[73] Assignee: Fuji Photo Film Co., Ltd., Kanagawa, Japan

[21] Appl. No.: 310,937

[22] Filed: Feb. 15, 1989

[30] Foreign Application Priority Data

Feb. 17, 1988 [JP] Japan ................................. 63-34645
Feb. 22, 1988 [JP] Japan ................................. 63-40354
Feb. 29, 1988 [JP] Japan ................................. 63-46326

[51] Int. Cl.$^5$ ............................................. B32B 3/02
[52] U.S. Cl. ..................................... 428/64; 428/65;
428/913; 346/1.1; 346/76 L; 346/135.1;
346/137; 369/284
[58] Field of Search ................... 428/64, 65, 908, 913;
346/76 L, 1.1, 135.1, 137; 369/284

[56] References Cited

U.S. PATENT DOCUMENTS

| | | | |
|---|---|---|---|
| 4,353,767 | 10/1982 | Wilkinson | 346/135.1 |
| 4,539,673 | 9/1985 | Winslow | 369/284 |
| 4,564,932 | 1/1986 | Lange | 369/284 |
| 4,590,493 | 5/1986 | Inoue et al. | 346/135.1 |
| 4,644,520 | 2/1987 | Lange | 369/284 |

Primary Examiner—Patrick Ryan
Attorney, Agent, or Firm—Sixbey, Friedman, Leedom & Ferguson

[57] ABSTRACT

An improvement of an information recording medium comprising a disc-shaped resin substrate having an inner-side non-recording zone and an outer-side non-recording zone, a laser-sensitive recording layer, and a flexible resin film (for protection of the recording layer, having protruded and depressed portions on at least the surface facing the recording layer is disclosed. The improvement comprises joining the substrate and the flexible resin to each other on the inner-side and outer-side non-recording zones through fusion by ultrasonic welding or thermal welding in such manner that at least one joining of the flexible resin film to the substrate on the outer-side non-recording zone and the inner-side non-recording zone is effected through a fused portion in the form of a discontinuous ring.

9 Claims, 4 Drawing Sheets

INFORMATION RECORDING MEDIUM

BACKGROUND OF THE INVENTION

1. Field of the Invention

The present invention relates to an information recording medium, and more particularly to an information recording medium comprising a disc-shaped resin substrate and a flexible disc-shaped resin film joined thereto and a recording layer enclosed with the combination of the substrate and resin film.

2. Description of Prior Art

Information recording media utilizing a beam of high energy density such as a laser beam have been developed in recent years and are now put into practical use. Such recording medium is generally called "optical disc", and the practical applications thereof have been found, for example, as a video disc and an audio disc as well as a disc memory for a large-capacity computer and a large-capacity static image file.

The optical disc basically comprises a disc-shaped transparent substrate of plastic material or glass material and a recording layer provided thereon. On the surface of the substrate where the recording layer is to be formed may be provided an undercoating layer or an intermediate layer made of polymer material to improve smoothness of the surface of the substrate and adhesion between the substrate and the recording layer and/or to enhance the sensitivity of the resulting optical disc.

Since the recording layer is readily susceptible to external influences, the recording layer is required to be protected from those influences. For the reason, a disc-shaped flexible resin film is covered over the substrate having the recording layer on the recording layer-side to protect the recording layer, and the technique for joining therewith is disclosed in Japanese Patent Provisional Publication No. 59(1984)-36339. The resin film is generally joined to the substrate on its inner-periphery side and outer-periphery side of the substrate, and thereby a sealed space is formed on the recording layer provided between the inner-periphery side and the outer-periphery side of the substrate.

In the optical disc having the above structure, air within the sealed space is likely expanded by variation of external atmospheric pressure or external temperature, whereby a tension is given to the resin film to cause unfavorable phenomena on the substrate such as warp or deformation of the substrate.

As an optical disc having the above-mentioned sealed space therein, an optical disc of air-sandwich structure is conventionally known. With respect to the optical disc of air-sandwich structure, there has been proposed a method of providing a venting hole for allowing air to freely flow (or pass) between the sealed space and the outside in order to adjust difference of atmospheric pressure therebetween. Accordingly, also in the optical disc having the above-mentioned flexible resin film as a protective layer, it can be assumed that a non-joining portion may be locally provided in the joining area between the substrate and the resin film to form a venting hole for adjustment of difference of atmospheric pressure between the inner space and the outside to prevent the above-mentioned unfavorable phenomena such as warp or deformation of the substrate. However, in the case of using the resin film as a protective layer, it is not easy to form a venting hole of suitable size in the known joining procedure. In more detail, when a venting hole is too large, external contaminants such as dust easily enter the inner space through the hole, and hence the recording layer is apt to be deteriorated or damaged. On the contrary, when the venting hole is too small, the aimed function for adjusting the atmospheric pressure is reduced.

SUMMARY OF THE INVENTION

It is an object of the present invention to provide a novel information recording medium.

It is another object of the invention to provide an information recording disc using a flexible resin film for protection of a recording layer on a substrate, in which warp or deformation of the substrate caused by expansion of air in the sealed space formed by the substrate and the resin film is prominently reduced, separation of the resin film from the substrate or application of dust on the recording layer does not substantially take place, and excellent recording characteristics can be kept for a long period of time.

There is provided by the present invention a information recording medium comprising a disc-shaped resin substrate having a hole at its center, an inner-side non-recording zone around the periphery of said hole and an outer-side non-recording zone inside the outer periphery of the substrate, a recording layer which is provided on the substrate between the inner-side non-recording zone and the outer-side non-recording zone, and a disc-shaped flexible resin film which is arranged on the recording layer-side surface of the substrate, said resin film having a hole at its center and protruded and depressed portions on at least the surface facing the recording layer; wherein said substrate and said flexible resin film are joined to each other both on the outer-side non-recording zone and the inner-side non-recording zone through fusion by ultrasonic welding or thermal welding in such manner that at least one joining of the flexible resin film to the substrate on the outer-side non-recording zone and the inner-side non-recording zone is effected through a fused portion in the form of a discontinuous ring.

There is also provided by the invention an information recording medium comprising a disc-shaped resin substrate having a hole at its center, an inner-side non-recording zone around the periphery of said hole and an outer-side non-recording zone inside the outer periphery of the substrate, a recording layer which is provided on the substrate between the inner-side non-recording zone and the outer-side non-recording zone, and a disc-shaped flexible resin film which is arranged on the recording layer-side surface of the substrate, said resin film having a hole at its center and protruded and depressed portions on at least the surface facing the recording layer; wherein said substrate and said flexible resin film are joined to each other on the inner-side non-recording zone through fusion by ultrasonic welding and on the outer-side non-recording zone through fusion by thermal welding in such manner that at least one joining of the flexible resin film to the substrate on the outer-side non-recording zone and the inner-side non-recording zone is effected through a fused portion in the form of a discontinuous ring.

In the information recording medium of the present invention, a plural number of venting holes are formed, so that warp or deformation of the substrate caused by expansion of air in the inner space formed by the resin substrate and the resin film does not substantially takes place even when the external atmospheric pressure largely varies.

Further, thus formed venting hole is so small that peeling (separation) of the resin film from the substrate or intrusion of dust into the recording layer side can be remarkably reduced and thereby excellent recording characteristics can be stably kept for a long period of time.

If the joining of the resin substrate to the resin film is made using an adhesive, it is difficult to reliably form a number of extremely small sized venting holes because the adhesive easily flows on the surface of the joining zone. In the case that the joining is made through fusion by ultrasonic welding or thermal welding, there can be readily and reliably obtained a number of venting holes of a desired extremely small size.

Furthermore, since the surface of the resin film facing the recording layer of the recordin medium of the invention is provided with protruded and depressed portions, the resin film is brought into point-contact with the recording layer. Hence, heat is hardly diffused in the pit-formation stage of the recording procedure and thereby pit-formation can be well performed. In more detail, a procedure of information recording in the information recording medium can be performed by irradiating the recording layer with a laser beam through the substrate to supply a thermal energy on the target area. The recording material on the target area of the recording layer is heated to melt or decompose so that a pit (i.e., hole) is formed in the recording layer. The point-contact of the resin film to the recording layer is effective to prevent diffusion of heat from the recording layer to the resin film, and hence the formation of the desired pit is well performed. Further, a space formed between the resin film and the recording layer assists decomposition of the irradiated recording material (which generally proceeds with production of gas), and hence the formation of the desired pits is well performed in the presence of the space over the recording layer.

DETAILED DESCRIPTION OF THE INVENTION

The present invention is described in more detail hereinafter by referring to the attached drawings.

Figure 1:
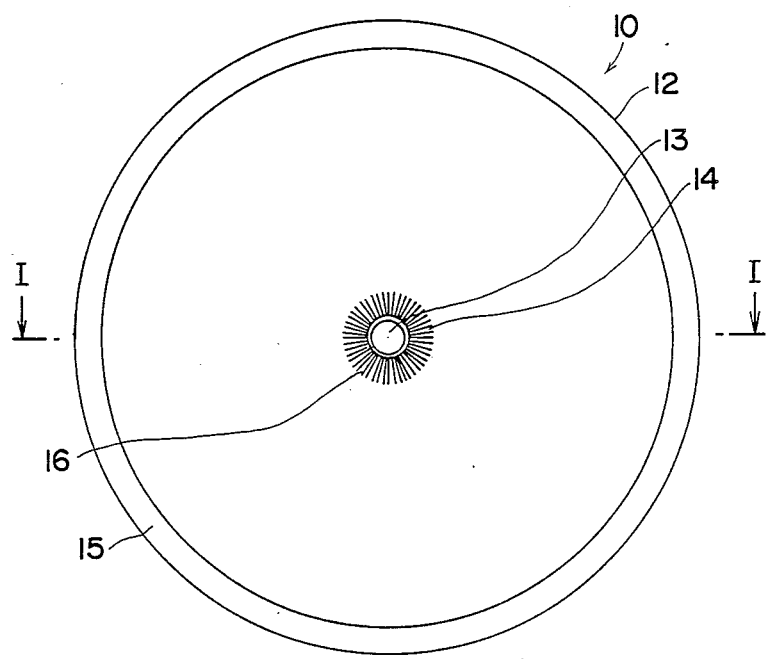
FIG. 1 is a plan view (from resin film side) of a representative information recording medium according to the present invention.
Figure 2:
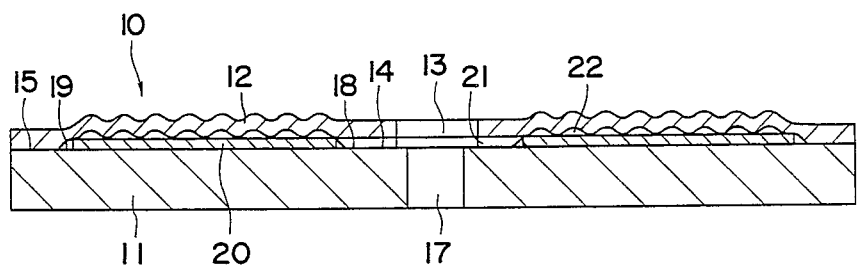
FIG. 2 is a sectional view taken along the line I—I of FIG. 1.

FIGS. 1 and 2 illustrate a preferred embodiment of the information recording medium of the invention. The information recording medium 10 comprises a disc-shaped resin substrate 11 and a disc-shaped resin film 12 joined to the substrate. FIG. 1 is a plan view of the information recording medium 10 on the side where the resin film 12 is joined.

The resin film 12 has a hole 13 at its central part, and is joined to the resin substrate 11 to form a ring-shaped inner joining area 14 and a ring-shaped outer joining area 15, both corresponding to non-recording zones provided on the substrate 11. The resin film is joined to the substrate on the inner joining area 14 to form a great number of long and narrow island-form joining portions 16 of substantially the same shapes at substantially the same intervals (spaces) in that area.

FIG. 2 is an enlarged sectional view of the information recording medium 10 taken along the line I—I of FIG. 1.

The resin substrate 11 has a hole 17 at its center, and is provided with an inner-side non-recording zone 18 on the inner periphery side of the substrate and an outer-side non-recording zone 19 on the outer periphery side of the substrate. Between those non-recording zones is provided a recording layer 20.

The disc-shaped resin film 12 are joined (welded) to the inner-side non-recording zone and the outer-side non-recording zone of the substrate, respectively, by means of ultrasonic welding or thermal welding, to form the inner joining area 14 and the outer joining area 15.

As shown in FIG. 1, joining on the inner joining area 14 is made by a great number of long and narrow island-form joining portions 16 arranged radially from the center of the resin substrate 11 at substantially the same intervals. Between the adjacent island-form joining portions 16 is formed a venting hole (non-welded portion) 21, and thereby air can freely pass (flow) between the outside of the recording medium and an inner space 22 formed by the above welding of the resin film 12 to the substrate 11. The space between the adjacent island-form joining potions generally is in the range of 0.01 to 3 mm, preferably in the range of 0.1 to 2 mm, more preferably in the range of 0.2 to 1 mm.

The resin film employable for the invention is a disc-shaped flexible resin film provided with protruded and depressed portions on at least the surface facing the recording layer. The resin film provided with such portions on both surfaces is preferably employed in the present invention, because such resin film has various advantages. For example, a damage given to a surface of the film of the resulting recording medium and a finger print, dust or the like sticked thereto are inconspicuous, and the resulting recording medium is not adhered to other recording medium during the piling procedure.

The process for the preparation of the information recording medium illustrated in FIGS. 1 and 2 will be described below.

The information recording medium of the invention has the above structure in which the disc-shaped flexible resin film provided with protruded and depressed portions on at least the surface facing the recording layer is joined to the disc-shaped resin substrate. Joining of the resin film to the substrate is made on the inner-side non-recording zone and/or the outer-side non-recording zone of the substrate in the form of discontinuous ring form. The joining can be conducted by any one of (1) a method using ultrasonic welding on both of the inner and outer periphery sides, (2) a method using thermal welding on both of the inner and outer periphery sides and (3) a method using ultrasonic welding on the inner periphery side and using thermal welding on the outer periphery side. Those three methods are described below in order, referring to the attached drawings At first, the method (1) using ultrasonic welding on both of the inner and outer periphery sides is described.

Figure 3:
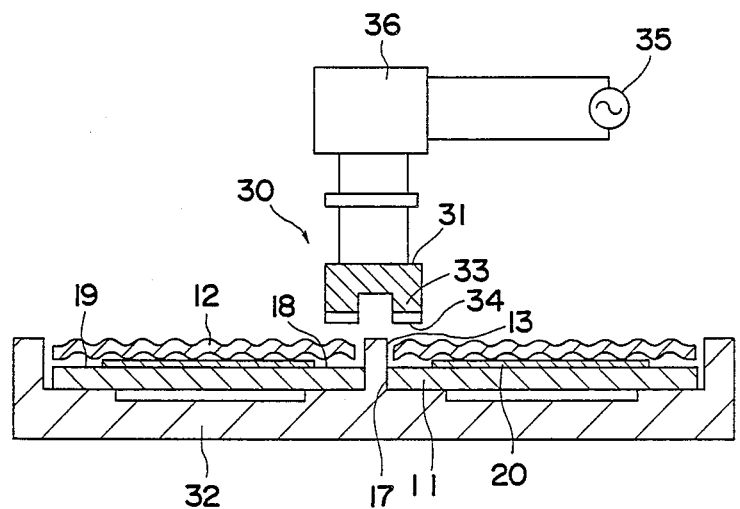
FIGS. 3, 4, 5 and 6 are sectional views illustrating a process for the preparation of an information recording medium of the invention.

In the first place, the resin film is welded to the resin substrate on the inner-side non-recording zone of the substrate as shown in FIG. 3.

A disc-shaped flexible resin film 12 having a hole 13 and provided with protruded and depressed portions on both surfaces is placed on a surface of a resin substrate 11 which is provided with an inner-side non-recording zone 18 and an outer-side non-recording zone 19 and has a recording layer between those zones in such a manner that the resin film faces the recording layer. The resin substrate 11 and the resin film 12 arranged as above is then placed between an ultrasonic welding machine 30 equipped with an ultrasonic wave-applying horn 31 (also referred to simply as "applying horn") and a receiving tool 32 in such a manner that the resin film 12 faces the applying horn 31.

The ultrasonic wave-applying horn 31 is provided with a ring-shaped raised portion 33 at the position corresponding to the inner-side non-recording zone 18 of the substrate 11, and on the tip of the ring-shaped raised portion 33 are provided with a number of protrusions 34 of wedge form arranged radially from the center of the applying horn 31 at substantially the same intervals.

In the ultrasonic welding machine 30, ultrasonic wave generated by an ultrasonic generator 35 is transmitted to the applying horn 31 via a converter 36.

Ultrasonic welding is carried out as follows. The applying horn 31 is descended to press the resin film 12 with the protrusions 34 provided on the tip of the ring-shaped raised portion 33 of the applying horn 31. While keeping this state, ultrasonic wave is applied to the resin film 12 to weld the film to the resin substrate 11. When the pressure is applied to the resin film 12, the film 12 is brought into contact with the substrate 11 at the positions corresponding to the protrusions 34, and ultrasonic welding is performed on those portions.

Thus, the resin substrate 11 is welded to the resin film 12 at the positions corresponding to a number of protrusions of wedge form arranged on the tip of the ring-shaped raised portion radially from the center of the applying horn 31 at substantially the same intervals so as to form island-form joining portions between the substrate 11 and the resin film 12.

On the tip of the ring-shaped raised portion are provided a great number of protrusions having substantially the same spaces, so that the space between the adjacent protrusions becomes essentially narrow, and such narrow space is suitable for forming a small venting hole.

Figure 4:
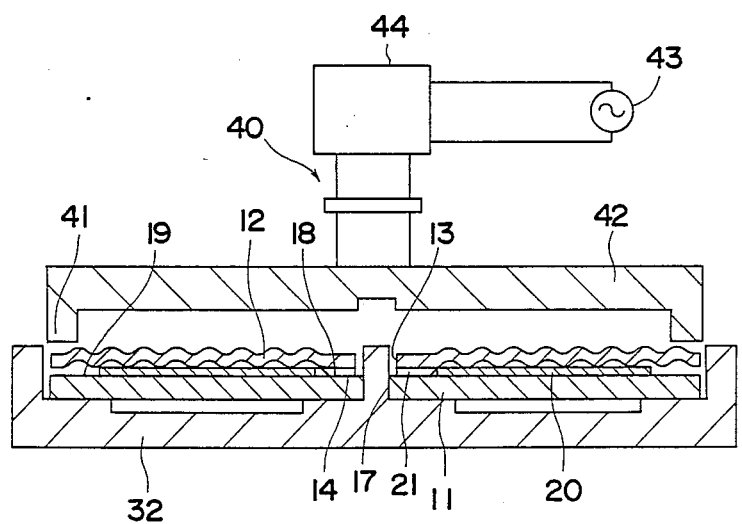

Subsequently, the resin film is joined to the resin substrate on the outer-side non-recording zone as shown in FIG. 4.

The welding of the resin film 12 to the resin substrate 11 on the outer-side non-recording zone 19 is carried out in the same manner as in the welding on the inner-side non-recording zone, using an ultrasonic welding machine 40 having an ultrasonic wave-applying horn 42 provided with a ring-shaped raised portion 41 at the position corresponding to the outer-side non-recording zone 19 of the substrate 11. In this case, the ring-shaped raised portion 41 is provided with no protrusion, so that any venting hole is not formed on the joining area on the outer-side non-recording zone 19.

Thus, the information recording medium of the present invention can be prepared

Secondly, the method (2) using thermal welding on both of the inner and outer periphery sides is described below.

Figure 5:
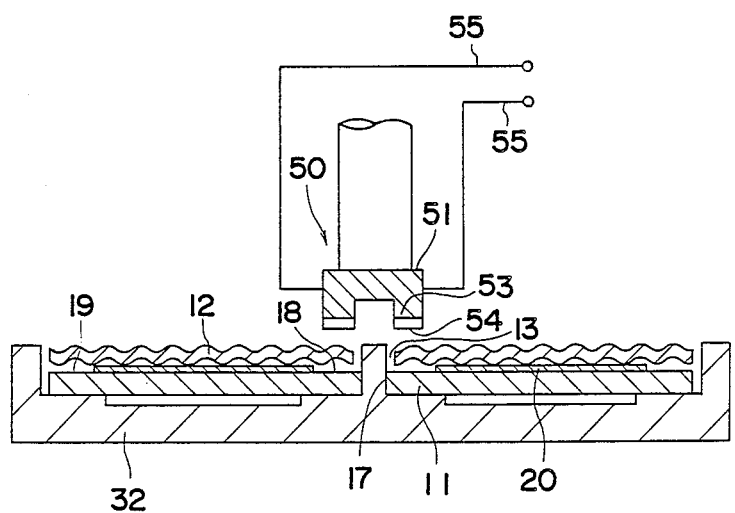

In the first place, the resin film is welded to the resin substrate on the inner-side non-recording zone of the substrate as shown in FIG. 5.

A disc-shaped flexible resin film 12 having a hole 13 and provided with protruded and depressed portions on both surfaces is placed on a surface of a resin substrate 11 which is provided with an inner-side non-recording zone 18 and an outer-side non-recording zone 19 and has a recording layer 20 between those non-recording zones in such a manner that the resin film faces the recording layer. The resin substrate 11 and the resin film 12 arranged as above is then placed between a thermal welding machine 50 equipped with a heater block 51 and a receiving tool 32 in such a manner that the resin film faces the heater block.

The heater block 51 is provided with a ring-shaped raised portion 53 at the position corresponding to the inner-side non-recording zone 18 of the substrate 11, and at the tip of the ring-shaped raised portion 53 are provided with a great number of protrusions 54 of wedge form arranged radially from the center of the heater block 51 at substantially the same intervals The heater block 51 is fed with electric current by feeders 55 to generate heat. The feeders 55 are preferably connected to the heater block symmetrically to each other to avoid non-uniformity of heat generation on the heater block.

Thermal welding is carried out as follows. The heater block 51 generating heat is descended to press the resin film 12 with the protrusions 54 provided on the tip of the ring-shaped raised portion 53 of the heater block 51 to weld the resin film 12 to the resin substrate 11. When the pressure is applied to the resin film 12, the film 12 is brought into contact with the substrate 11 at the positions corresponding to the protrusions 54, and thermal welding is performed on those portions Thus, the resin film 12 is welded to the resin substrate 11 at the positions corresponding to a number of protrusions of wedge form 54 arranged on the tip of the ring-shaped raised portion radially from the center of the heater block 51 at substantially the same intervals so as to form island-form joining portions between the substrate 11 and the resin film 12.

On the tip of the ring-shaped raised portion are provided a great number of protrusions having substantially the same spaces, so that the space between the adjacent protrusions becomes essentially narrow, and such narrow space is suitable for forming a small venting hole.

Figure 6:
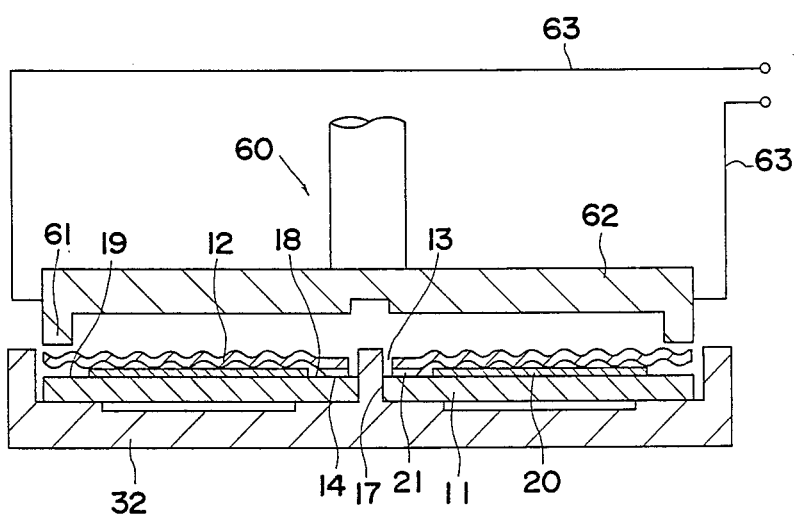

Subsequently, the resin film is welded to the resin substrate on the outer-side non-recording zone as shown in FIG. 6.

The welding of the resin film to the substrate on the outer-side non-recording zone of the substrate is carried out in the same manner as in the welding on the inner-side non-recording zone, using a thermal welding machine 60 having a heater block 62 provided with a ring-shaped raised portion 61 at the position corresponding to the outer-side non-recording zone 19 of the resin substrate 11. In this case, the ring-shaped raised portion 61 is provided no protrusion, so that any venting hole is not formed on the joining area on the outer-side non-recording zone 19.

Thus, another example of the information recording medium of the invention can be prepared.

Figure 7:
FIG. 7 is a plan view showing arrangement of protrusions provided on the tip of a ring-shaped raised portion of an ultrasonic wave-applying horn employed for ultrasonic welding.

FIG. 7 shows an arrangement of the protrusions provided on the tip of the ring-shaped raised portion of the applying horn or the heater block. The protrusions are arranged radially from the center of the applying horn or the heater block at substantially the same spaces.

Figure 8:
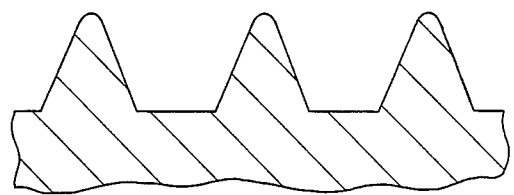
FIG. 8 is a sectional view of the protrusions shown in FIG. 7.

FIG. 8 is a sectional view of the protrusions shown in FIG. 7. The section of the raised portion is wedge form having a round tip.

Finally, the method (3) using ultrasonic welding on the inner periphery side and using thermal welding on the outer periphery side is described below.

This method preferably utilizes the above-mentioned methods (1) and (2). In this method, the resin film is welded to the resin substrate on the inner-side non-recording zone 18 using ultrasonic welding as shown in FIG. 6 to form island-form joining portions having substantially the same intervals. On the other hand, the resin film is welded to the resin substrate on the outer-side non-recording zone 19 using thermal welding as shown in FIG. 6 without forming any venting hole.

The information recording medium of the invention can be also prepared using both of the ultrasonic welding and the thermal welding as described above.

As described in the method (1) or (2), the information recording medium of the invention can be also prepared by joining the disc-shaped resin film to the disc-shaped resin substrate using only one of the ultrasonic welding and the thermal welding.

The resulting recording medium prepared by utilizing the method (1), (2) or (3) can maintain satisfactory recording characteristics for a long period of time.

However, in the case of utilizing thermal welding, the resin film tends to suffer heat shrinkage or deformation owing to thermal influence, so that the welding conditions should be determined in careful consideration. On the other hand, in the case of ultrasonic welding which is almost free from the problem of heat shrinkage, a large energy is required in a large welding area, and thereby the resin film is vibrated to likely cause a damage on the surface of the resin substrate. Hence, careful conditions are also required in the ultrasonic welding.

In the information recording medium of the invention prepared by the method (3), the resin substrate and the resin film are joined to each other using ultrasonic welding on the inner periphery side having a small welding area and using thermal welding on the outer periphery side having a large welding area, that is, the resin substrate and the resin film are joined utilizing a combination of the ultrasonic welding and the thermal welding to remove disadvantages of each welding. Accordingly, the recording medium is remarkably reduced in warp or deformation of the resin substrate.

The recording medium shown in FIGS. 1 and 2 or the recording media prepared by the above-mentioned methods (1), (2) and (3) are preferred embodiments of the information recording medium of the present invention, but the invention is by no means restricted to those embodiments.

For example, the island-form joining portion may be a dot-form joining portion. Further, the island-form joining portions are not the same as each other in the shape or the interval, and the shape or the interval thereof can be appropriately varied.

The order of the welding on the inner periphery side and the welding on the outer periphery side can be also changed, or those welding can be simultaneously carried out.

The protrusions on the raised portion of the thermal welding machine or the ultrasonic welding machine used for producing the information recording medium of the invention may be provided on any one of the inner and the outer periphery sides, or they may be provided on both sides.

Furthermore, the information recording medium of the invention does not necessarily have the structure shown in FIGS. 1 and 2, provided that the disc-shaped flexible resin film having protruded and depressed portions on at least the inner surface is joined to the resin substrate in the ring-shaped joining areas on the inner-side non-recording zone and the outer-side non-recording zone by means of ultrasonic welding or thermal welding, and that the joining on the inner-side non-recording zone and/or the outer-side non-recording zone is made in the form of discontinuous ring. For example, the joining area may have only a small number of non-welding portions such as one or two non-welding portions. Even in this case, by using the disc-shaped flexible resin film having the protruded and depressed portions on at least the inner surface, tops of the protruded portions of the film locally contact the surface of the substrate to finely divide the non-welding portion (venting hole), and thereby the venting hole becomes comb shape. Owing to the comb-shaped venting hole, intrusion of dust from the outside can be efficiently prevented. Further, in the case of the comb-shaped venting hole, the top of the protruded portion of the resin film separates from the surface of the substrate when the pressure within the inner space on the recording layer increases, and hence the size of the venting hole coincides with the length of the non-welding portion and adjustment of atmospheric pressure can be smoothly accomplished.

The joining area between the resin substrate and the resin film is a non-recording zone, but a material of the recording layer may be supplied on the whole surface of the substrate from the periphery of the hole to the outer periphery of the substrate, that is, the recording layer material may exist on the non-recording zone.

The resin film may be subjected to label printing

The resin film, recording layer and the substrate constituting the information recording medium of the invention can be selected from those conventionally employed. They are briefly described below.

The resin film employable in the invention generally has a thickness of 10 to 500 $\mu$m, preferably 50 to 200 $\mu$m. The maximum depth of the protruded and depressed portions of the resin film is generally in the range of 1 to 50 $\mu$m, preferably in the range of 2 to 30 $\mu$m.

There is no specific limitation on the material of the resin film, provided that the resin film is sufficiently welded to the substrate by means of ultrasonic welding. A resin film having the same host component as that of the substrate material is preferably employed, and more preferably employed is a resin film having the same material as that of the substrate. Examples of the resin film materials include thermoplastic resins such as acrylic resins, vinyl chloride resins, polystyrene resin, polyamide resins, polyolefin resins (e.g., polypropylene, polyethylene), polycarbonate resins, polyester resins and polyvinylidene chloride resins A material of the resin substrate employable in the invention can be optionally selected from those conventionally used for the known information recording media. As substrate materials, preferably employed are acrylic resins such as cell cast polymethyl methacrylate, injection-molded polymethyl methacrylate and polymethyl acrylate; vinyl chloride resins such as polyvinyl chloride and vinyl chloride copolymers; epoxy resins; amorphous polyolefins; and other synthetic resins such as polycarbonate, from the viewpoints of optical characteristics, surface smoothness, processability, handling properties, long-term stability and manufacturing cost. Among them, polymethyl methacrylate, polycarbonates and epoxy resins are preferred from the viewpoints of dimensional stability, transparency and surface smoothness.

On the surface of the substrate where the recording layer is to be formed, an undercoat layer (and/or an intermediate layer) may be provided to improve surface smoothness and adhesion or prevent the recording layer from being denatured.

Examples of materials for the preparation of the undercoating layer and/or the intermediate layer include polymer materials such as polymethyl methacrylate, acrylic acid-methacrylic acid copolymer, nitrocellulose, polyethylene and polycarbonate; organic materials such as silane coupling agent; and inorganic material such as inorganic oxides (e.g., $SiO_2$, $Al_2O_3$) and inorganic fluorides (e.g., $MgF_2$).

Examples of materials for the preparation of the recording layer include metals such as Te, Zn, In, Sn, Zr, Al, Ti, Cu, Ge, Au and Pt; semimetals such as Bi, As and Sb; semiconductors such as Si; and alloys or mixtures thereof. Also employable are compounds of these metals, semimetals and semiconductors such as sulfides, oxides, borides, silicates, carbides and nitrides, or mixtures of these compounds and metals. Otherwise, dyes or combinations of dyes and polymers, the above-mentioned metals or semimetals can be also employed as the recording layer material.

The recording layer may contain other metals, semimetals or compounds thereof than the above-mentioned ones which are conventionally used for known recording media.

The recording layer can be formed on the substrate directly or through an undercoat layer by means of metallizing, sputtering, ion plating or coating. The recording layer may be composed of a single layer or plural layers. The thickness of the recording layer is generally in the range of 100 to 5,500 angstroms, preferably 150 to 1,000 angstroms from the viewpoint of optical density required for optical information recording.

On the surface of the substrate not facing the recording layer may be provided a thin film made of an inorganic material such as silicon dioxide, tin oxide or magnesium fluoride or a polymer material such as a thermoplastic resin or a photo-setting resin by means of vacuum deposition, sputtering or coating to enhance resistance to damage and resistance to moisture.

The examples and the reference examples of the present invention are given below.

EXAMPLE 1

(1) A disc-shaped polycarbonate substrate having a tracking groove (outer diameter: 120 mm, inner diameter: 15 mm, thickness: 1.2 mm, provided with a groove of spiral form having depth of 0.06 μm, width of 1.1 μm and pitch of 1.6 μm within the region of inner diameter of 45 mm and outer diameter of 116 mm) was prepared by injection molding.

(2) On the surface of the above substrate where the tracking groove was provided was coated a coating solution having the following composition by means of spin coating at 700 r.p.m., and the coated layer of the solution was dried at 70° C. for 10 min to form a chlorinated polyethylene layer having dry thickness of 400 angstroms on the substrate.

| Composition of coating solution | |
|---|---|
| Chlorinated polyethylene $-\!(C_2H_{4-y}Cl_y)\!-\!n$ (y = 1.7, n = 200) | 0.3 part |
| n-butyl acetate | 1 part |
| Methyl ethyl ketone | 9 parts |
| Cyclohexane | 100 parts |

(3) On the chlorinated polyethylene layer were vapor-deposited together with Au, In and GeS in the ratio of 35:40:25 (Au:In:GeS, by weight) to form a recording layer of 1,000 angstroms thick on the chlorinated polyethylene layer. In this stage, the electric current fed to the vaporization source of Au was controlled in such a manner that the concentration of Au in the recording layer would be higher on the substrate side surface and lower on the recording layer side. The concentration of Au in the obtained recording layer on the substrate side surface was 80% by weight.

(4) A polycarbonate film (Eupilon Mat Film EE-2000 M01 of Mitsubishi Gas Chemical Co., Ltd , thickness: 130 μm) provided with extremely small sized protruded and depressed portions on both surfaces (surface A and surface B, maximum depth of protruded and depressed portions on surface A: 7.2 μm, Ra of surface A: approx. 1.6 μm, maximum depth of protruded and depressed portions on surface B: 3.2 μm, Ra of surface B: approx. 0.6 μm) was cut into a disc-shaped film having a diameter of its central hole of 35 mm and an outer diameter of 120 mm.

(5) The mat film was placed on the recording layer-side surface of the substrate concentrically in such a manner that the surface A having larger Ra faced the recording layer.

(6) An ultrasonic wave-applying horn (whose tip to be in contact with the film surface was provided with protrusions of wedge form having a height of 0.6 mm and a space (between tips of the adjacent protrusions) of 0.8 mm arranged radially from the center of the horn) of an ultrasonic welding machine was placed on the outer periphery of an imaginary concentric circle having a diameter of 37 mm on the mat film, and ultrasonic wave was applied to the film under application of pressure to weld the film to the substrate on the inner-side non-recording zone of the substrate.

(7) An ultrasonic wave-applying horn (whose tip to be in contact with the film surface was provided with protrusions of wedge form having a height of 0.6 mm and a space (between tips of the adjacent protrusions) of 0.8 mm arranged radially from the center of the horn) of an ultrasonic welding machine was placed on the outer periphery of an imaginary concentric circle having a diameter of 119 mm on the above-treated mat film, and ultrasonic wave was applied to the film under application of pressure to weld the film to the substrate on the outer-side non-recording zone of the substrate.

Thus, an optical disc (information recording medium) in which the resin film was joined to the resin substrate having the recording layer thereon was produced.

EXAMPLE 2

The procedures of Example 1 were repeated except that the steps (2) and (3) for forming a recording layer on the substrate were replaced with the following steps (2) and (3), to prepare an optical disc in which the resin film was joined to the resin substrate having the recording layer thereon.

(2) In 100 cc of 1,1,2,2-tetrafluoropropanol was dissolved 1 g of a cyanine dye having the following formula to prepare a coating solution (concentration: 1 wt. %) for the formation of a dye-type recording layer.

Cyanine dye

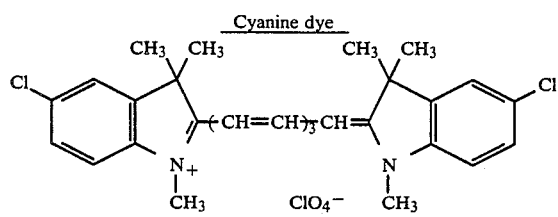

(3) The obtained coating solution was coated on the surface of the substrate having the tracking groove thereon by spin coating at 850 r.p.m., and the coated layer of the solution was dried at 70° C. for 10 min. to form a recording layer having a thickness of 600 angstroms on the substrate.

EXAMPLE 3

The procedures of Example 1 were repeated except that the steps (6) and (7) for performing ultrasonic welding were replaced with the following steps (6) and (7), to prepare an optical disc in which the resin film was joined to the resin substrate having the recording layer thereon.

(6) A heater block (whose tip to be in contact with the film surface was provided with protrusions of wedge form having a height of 0.6 mm and an interval between tips of the adjacent protrusions of 0.8 mm arranged radially from the center of the heater block) of a thermal welding machine was placed on the outer periphery of an imaginary concentric circle having a diameter of 37 mm on the mat film, and heat was applied to the resin film under application of pressure to weld the film to the substrate on the inner-side non-recording zone of the substrate.

(7) A heater block (whose tip to be in contact with the film surface was provided with protrusions of wedge form having a height of 0.6 mm and an interval between tips of the adjacent protrusions of 0.8 mm arranged radially from the center of the heater block) of a thermal welding machine was placed on the outer periphery of an imaginary concentric circle having a diameter of 119 mm of the above-treated mat film, and heat was applied to the resin film under application of pressure to weld the film to the substrate on the outer-side non-recording zone of the substrate.

EXAMPLE 4

The procedures of Example 3 were repeated except that the steps (2) and (3) for forming a recording layer on the substrate were replaced with the following steps (2) and (3), to prepare an optical disc in which the resin film was joined to the resin substrate having the recording layer thereon.

(2) In 100 cc of 1,1,2,2-tetrafluoropropanol was dissolved 1 g of a cyanine dye having the following formula to prepare a coating solution (concentration: 1 wt. %) for the formation of a dye-type recording layer.

Cyanine dye

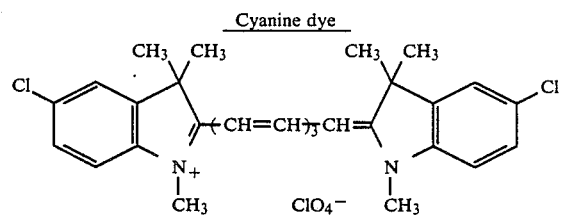

(3) The obtained coating solution was coated on the surface of the substrate having the tracking groove thereon by spin coating at 850 r.p.m., and the coated layer of the solution was dried at 70° C. for 10 min. to form a recording layer having a thickness of 600 angstroms on the substrate.

EXAMPLE 5

The procedures of Example 1 were repeated except that the steps (6) and (7) for performing ultrasonic welding were replaced with the following steps (6) and (7), to prepare an optical disc in which the resin film was joined to the resin substrate having the recording layer thereon.

(6) A heater block (whose tip to be in contact with the film surface was provided with protrusions of wedge form having a height of 0.6 mm and an interval between tips of the adjacent protrusions of 0.8 mm arranged radially from the center of the heater block) of a thermal welding machine was placed on the outer periphery of an imaginary concentric circle having a diameter of 37 mm of the mat film, and heat was applied to the resin film under application of pressure to weld the film to the substrate on the inner-side non-recording zone of the substrate.

(7) An ultrasonic wave-applying horn (whose tip to be in contact with the film surface was provided with protrusions of wedge form having a height of 0.6 mm and an interval between tips of the adjacent protrusions of 0.8 mm arranged radially from the center of the horn) of an ultrasonic welding machine was placed on the outer periphery of an imaginary concentric circle having a diameter of 119 mm of the above-treated mat film, and ultrasonic wave was applied to the film under application of pressure to weld the film to the substrate on the outer-side non-recording zone of the substrate.

EXAMPLE 6

The procedures of Example 5 were repeated except that the steps (2) and (3) for forming a recording layer on the substrate were replaced with the following steps (2) and (3), to prepare an optical disc in which the resin film was joined to the resin substrate having the recording layer thereon.

(2) In 100 cc of 1,1,2,2-tetrafluoropropanol was dissolved 1 g of a cyanine dye having the following formula to prepare a coating solution (concentration: 1 wt. %) for the formation of a dye-type recording layer.

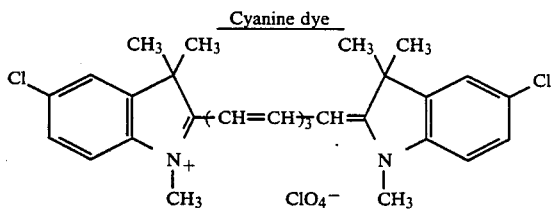

Cyanine dye (3) The obtained coating solution was coated on the surface of the substrate having the tracking groove thereon by spin coating at 850 r.p.m., and the coated layer of the solution was dried at 70° C. for 10 min. to form a recording layer having a thickness of 600 angstroms on the substrate.

REFERENCE EXAMPLE 1

The procedures of Example 1 were repeated except for not joining the resin film to the substrate, to prepare an optical disc.

REFERENCE EXAMPLE 2

The procedures of Example 2 were repeated except for not joining the resin film to the substrate, to prepare an optical disc.

Evaluation of Information Recording Medium

The obtained optical discs were evaluated on the sensitivity, C/N ratio, jitter, occurrence of error in the reproduction procedure, tendency of warp of the substrate and occurrence of vibration on the surface of the disc according to the following tests.

Sensitivity

EFM signals of CD format were recorded on each of the optical discs obtained in Examples 1 to 6 and Reference Examples 1 and 2 at recording power of 8.0 mW and a fixed linear speed of 1.3 m/sec. using a disc evaluation device (Nakamichi DisK Evaluation Device OMS-1000), and the minimum recording power (sensitivity) capable of recording the signals was measured.

C/N ratio

The signals recorded on the optical disc as above were reproduced at a reproducing power of 0.8 mW at a fixed linear speed of 1.3 m/sec. using a CD player (available from YAMAHA Co., Ltd.), to measure C/N ratio.

Jitter

The reproduced signals of binary value were measured on the period of time required from rising of signals to falling thereof and the period of time required from falling of signals to rising thereof per each wavelength of the signals at a number of times, and the standard deviation (jitter) was obtained from the measured values.

Occurrence of Error

Occurrence of error in the above-mentioned reproduction procedure was measured using a Universal Counter TR5823 (available from Advantest Co., Ltd.).

Tendency of Warp of Substrate

Tendency of warp of the substrate was evaluated by laser beam on the optical disc by means of a movable mirror and measuring variation of driving voltage of the mirror servoing inclination of the reflected light caused by the warp of the substrate under rotation of the optical disc.

Occurrence of Vibration

Occurrence of vibration of the surface of the optical disc was evaluated by that the focus was able to be controlled by means of a focus servo of the above-mentioned CD player or not.

The results of the evaluations are as follows.

(1) Any significant difference between Examples 1, 3 & 5 and Reference Example 1, or between Examples 2, 4 & 6 and Reference Example 2 was not observed with respect to all of the evaluations on the sensitivity, C/N ratio, jitter, occurrence of error, tendency of warp of the substrate and occurrence of vibration. In other words, there was no difference caused by the presence or absence of the resin film among the optical discs.

(2) The optical discs obtained in Examples 1 to 6 were stored in a constant temperature and constant humidity apparatus at 60° C. and 90% RH to observe separation (peeling) of the resin film from the substrate (through eye judgment), warp of the substrate and surface vibration. As a result, any change was not observed between before and after the storage of the disc in the apparatus.

(3) The optical discs obtained in Examples 1 and 2 were contained in a vacuum container and the pressure was reduced to one Torr in the container to observe swelling of the resin film (through eye judgment) and warp of the substrate. As a result, any swelling of the resin film and any warp of the substrate was not observed.

In brief, it was confirmed that the optical discs obtained in Examples 1 to 6 were free from any deformation of the substrate even if the temperature or the atmospheric pressure varied, because each of the discs was prepared by welding the resin film to the substrate on the inner-side non-recording zone and the outer-side non-recording zone by means of ultrasonic welding using an ultrasonic wave-applying horn provided with protrusions or thermal welding using a heater block provided with protrusions, and thereby small sized venting holes for making the optical disc air-permeable were formed.

I claim:

1. An information recording medium comprising a disc-shaped resin substrate having a hole at its center, an inner-side non-recording zone around the periphery of said hole and an outer-side non-recording zone inside the outer periphery of the substrate, a recording layer which is provided on the substrate between the inner-side non-recording zone and the outer-side non-recording zone, and a disc-shaped flexible resin film which is arranged on the recording layer-side surface of the substrate, said resin film having a hole at its center and protruded and depressed portions on at least the surface facing the recording layer; wherein said substrate and said flexible resin film are joined to each other both on the outer-side non-recording zone and the inner-side non-recording zone through fusion by ultrasonic welding in such manner that at least one joining of the flexible resin film to the substrate on the outer-side non-recording zone and the inner-side non-recording zone is effected through a fused portion in the form of a discontinuous ring.

2. The information recording medium as claimed in claim 1, wherein said discontinuous ring comprises a plural number of fused islands arranged at spaces.

3. The information recording medium as claimed in claim 1, wherein said joining through the fused portion in the form of a discontinuous reing is effected only on the inner-side non-recording zone.

4. An information recording medium comprising a disc-shaped resin substrate having a hole at its center, an inner-side non-recording zone around the periphery of said hole and an outer-side non-recording zone inside the outer periphery of the substrate, a recording layer which is provided on the substrate between the inner-side non-recording zone and the outer-side non-recording zone, and a disc-shaped flexible resin film which is arranged on the recording layer-side surface of the substrate, said resin film having a hole at its center and protruded and depressed portions on at least the surface facing the recording layer; wherein said substrate and said flexible resin film are joined to each other both on the outer-side non-recording zone and the inner-side non-recording zone through fusion by thermal welding in such manner that at least one joining of the flexible resin film to the substrate on the outer-side non-recording zone and the inner-side non-recording zone is effected through a fused portion in the form of a discontinuous ring.

5. The information recording medium as claimed in claim 3, wherein said discontinuous ring comprises a plural number of fused islands arranged at spaces.

6. The information recording medium as claimed in claim 3, wherein said joining through the fused portion in the form of a discontinuous reing is effected only on the inner-side non-recording zone.

7. An information recording medium comprising a disc-shaped resin substrate having a hole at its center, an inner-side non-recording zone around the periphery of said hole and an outer-side non-recording zone inside the outer periphery of the substrate, a recording layer which is provided on the substrate between the inner-side non-recording zone and the outer-side non-recording zone, and a disc-shaped flexible resin film which is arranged on the recording layer-side surface of the substrate, said resin film having a hole at its center and protruded and depressed portions on at least the surface facing the recording layer; wherein said substrate and said flexible resin film are joined to each other on the inner-side non-recording zone through fusion by ultrasonic welding and on the outer-side non-recording zone through fusion by thermal welding in such manner that at least one joining of the flexible resin film to the substrate on the outer-side non-recording zone and the inner-side non-recording zone is effected through a fused portion in the form of a discontinuous ring.

8. The information recording medium as claimed in claim 7, wherein said discontinuous ring comprises a plural number of fused islands arranged at spaces.

9. The information recording medium as claimed in claim 7, wherein said joining through the fused portion in the form of a discontinuous reing is effected only on the inner-side non-recording zone.

* * * * *